United States Patent [19]

Burba et al.

[11] Patent Number: 5,406,091
[45] Date of Patent: Apr. 11, 1995

[54] COMMUNICATION NETWORK OPTICAL ISOLATION CIRCUIT

[75] Inventors: Joseph C. Burba, Dexter; David J. Bardsley, Jr., Ann Arbor, both of Mich.

[73] Assignee: Ford Motor Company, Dearborn, Mich.

[21] Appl. No.: 67,925

[22] Filed: May 27, 1993

[51] Int. Cl.$^6$ .............................................. H04B 9/00
[52] U.S. Cl. .................... 250/551; 359/136; 359/143
[58] Field of Search ............... 250/551; 359/136, 143, 359/144; 370/55, 13, 64, 60, 4

[56] References Cited

U.S. PATENT DOCUMENTS

| | | | |
|---|---|---|---|
| 4,176,401 | 11/1979 | Lonberger | 250/551 |
| 4,197,471 | 4/1980 | Lackey et al. | 307/311 |
| 4,243,890 | 1/1981 | Miller et al. | 250/551 |
| 4,282,604 | 8/1981 | Jefferson | 250/551 |
| 4,420,841 | 12/1983 | Dudash | 250/551 |
| 4,435,764 | 3/1984 | El-Gohary | 364/200 |
| 4,596,048 | 6/1986 | Dunki-Jacobs | 250/551 |
| 4,715,031 | 12/1987 | Crawford et al. | 370/85 |
| 4,727,535 | 2/1988 | Brandt | 250/551 |
| 4,768,202 | 8/1988 | La Croix et al. | 359/143 |
| 4,809,257 | 2/1989 | Gantenbein et al. | 359/136 |
| 4,809,361 | 2/1989 | Okada et al. | 359/136 |
| 5,144,466 | 9/1992 | Nakamura et al. | 359/136 |

Primary Examiner—David C. Nelms
Assistant Examiner—Stephone B. Allen
Attorney, Agent, or Firm—Roger L. May; Richard D. Dixon

[57] ABSTRACT

An optical isolator for use in an electrically powered vehicle for interfacing between a signal processing system having a first ground and a power conversion system, which is operated responsive to control signals from the signal processing system, having a second ground that varies in potential from the first ground. A bi-directional digital communications network is provided having a first node coupled to the signal processing system for generating and receiving digital messages with respect to the first ground, and having a second node coupled to the power conversion system for receiving and generating digital messages with respect to the second ground. The bi-directional digital communications network has a unique start signal and a dominant hierarchy that allows bit-wise contention among messages for assuring communication of high priority messages between the first and second nodes within a predetermined minimum time period. The optical isolator is interposed in the communications network between the first and second nodes for transmitting the digital messages therebetween, while electrically isolating the first ground from the second ground, thereby enabling a reliable digital communications system between the first and second nodes without using a common ground system.

9 Claims, 5 Drawing Sheets

Basic Message Format

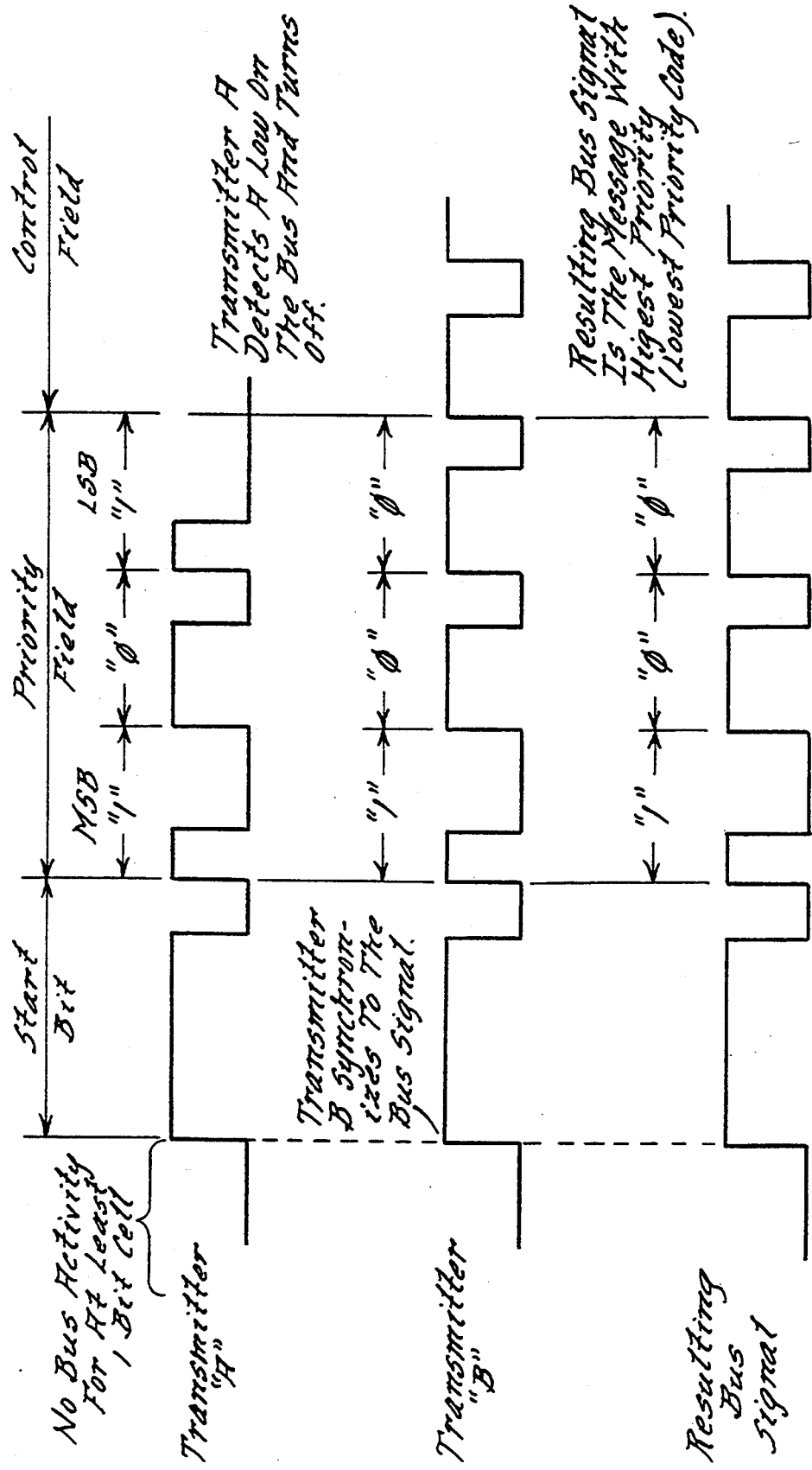

COMMUNICATION NETWORK OPTICAL ISOLATION CIRCUIT

BACKGROUND OF THE INVENTION

The following may be a subject invention developed under Department of Energy Contract DC-AC07-90ID13019, and the United States government may have certain rights and/or licenses in this invention.

1. Field of the Invention

The present invention relates to optical isolation circuits of the type used between signal processing and power control circuits having different electrical grounds. The invention is specifically designed for use in an electrically powered vehicle for coupling the vehicle control system with the power invertor/motor controller system.

2. Description of the Prior Art

Electric motors of the type used in the powertrain systems for electrically propelled vehicles utilize high voltage dc batteries for storing electrical energy. The dc power from the batteries is processed through a high voltage power invertor system that increases the voltage, conditions the waveform, and controls the application of voltage and current to the electric motors propelling the vehicle. The electrical invertor and motor control systems utilize high voltage and high current switching devices that create electromagnetic interference that, if uncontrolled, can cause substantial interference to the low power and low signal electronic systems used throughout the remainder of the electric vehicle.

It is therefore advantageous to isolate the power system used for propulsion from the electronic systems used in the remainder of the vehicle. One method of accomplishing this objective to electrically shield the battery and/or power control components, as well as providing separate grounds for the high voltage power conversion system components and for the low voltage signal control electronics.

The isolation between the two ground systems may be accomplished by using an optical isolator for converting the electrical control signals to optical energy, passing the optical signal across an electrical isolation bridge, and then using an optical receiving system for converting the optical signal back to an electrical control signal having a separate ground from the original transmitting system. While such optical isolators have been utilized in communications systems of the type employing frequency division multiplexing and time division multiplexing techniques, the prior art does not reflect the use of such optical isolators in a bi-directional digital network control system that is used between the electronic controller and the power propulsion systems of an electric vehicle.

It is therefore a first object of the present invention to provide an optical isolator interposed in a digital communications network for isolating the ground system used by the propulsion electronics from the ground system utilized by the signal control electronics. It is another object of the present invention that the optical isolator must have sufficient speed such that instantaneous, bit-wise contention among messages within the bi-directional digital communications network is not rendered inoperative and that the control speed of the system is not destabilized under worst case conditions. Still another object of the present invention is to provide an optical isolator with sufficient speed such that the timing between the opposite portions of the bi-directional digital communications network are not operatively disrupted.

SUMMARY OF THE INVENTION

The present invention is directed to an optical isolator for use in an electrically powered vehicle for interfacing between a signal processing system having a first ground and a power conversion system, operated responsive to control signals from the signal processing system, having a second ground that varies in potential from the first ground. A bi-directional digital communications network is provided having a first node coupled to the signal processing system for generating and receiving digital messages with respect to the first ground, and having a second node coupled to the power conversion system for receiving and generating digital messages with respect to the second ground. The bi-directional digital communications network includes a unique start signal and a dominant hierarchy that allows bit-wise contention among messages for assuring communication of high priority messages between the first and second nodes within a predetermined minimum time. The optical isolator is interposed between the first and second nodes of the bi-directional digital communications network for transmitting the digital messages therebetween, while electrically isolating the first ground from the second ground.

BRIEF DESCRIPTION OF THE DRAWINGS

Other objects, features and advantages of the present invention will be apparent from a study of the specification and the drawings in which:

FIG. 6 illustrates waveforms in the bitwise arbitration process.

DETAILED DESCRIPTION OF THE PREFERRED EMBODIMENT

Figure 1:
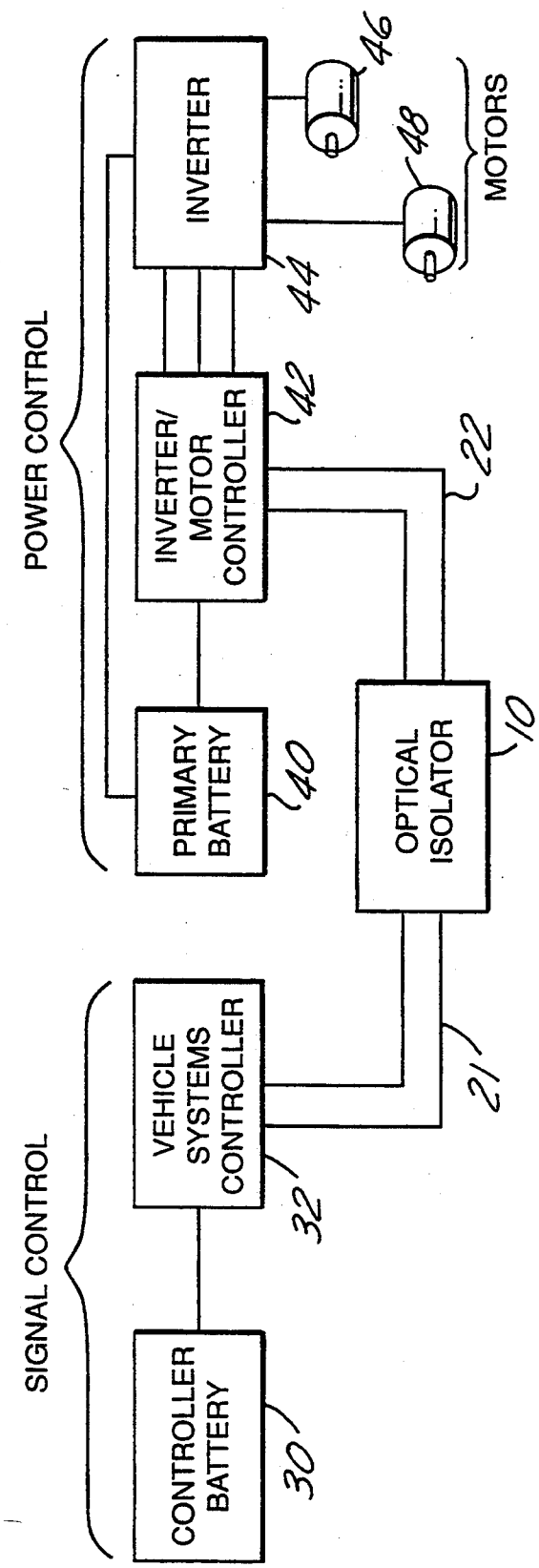
FIG. 1 illustrates a simplified schematic block diagram of the signal control and power control electronic subsystems used in an electric vehicle.
Figure 3:
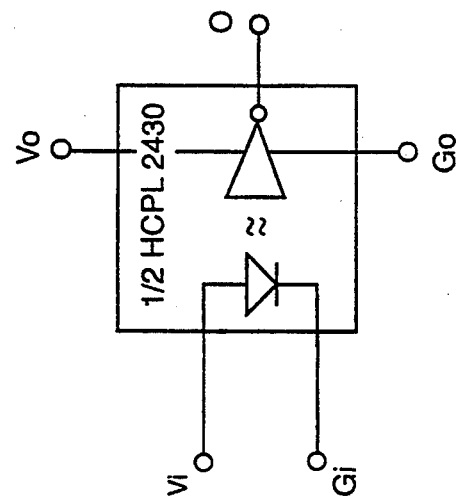
FIG. 3 illustrates a simplified schematic diagram of an optical isolator in accordance with the present invention.

With reference to FIG. 1, an optical isolator in accordance with the present invention is designated by reference numeral 10 as being interposed between a first section 21 and a second section 22 of a bi-directional digital communications network in accordance with the present invention. The first end 21 of the communications network is coupled to a vehicle systems controller 32 that derives power from the controller battery 30. This controller battery is separate from a higher voltage primary battery 40 used in the propulsion system of the electric vehicle. The primary battery 40 is coupled to an invertor/motor controller 42 that processes and controls the electrical energy conversion cycle within the invertor 44. The output voltage and current from the invertor 44 is coupled to motors 46 and 48 of the type used to drive the transmission and/or wheels of the electrically propelled vehicle.

The vehicle systems controller 32 typically includes a microcontroller, memory and various small signal electronic circuits that are used to store and execute control algorithms that are used for controlling the operation of the invertor/motor controller. The vehicle systems controller 32 uses a low voltage battery, typically 5 to 12 volts, because the small signal electronics within the vehicle controller system 32 do not consume large amount of power. This should be contrasted to the primary vehicle battery 40 that must store the energy for propelling the vehicle. The primary vehicle battery 40 can have voltages approaching 400 volts dc and can generate average currents approaching 300 amps.

The invertor 44 processes this high voltage and high current dc energy into waveforms that are optimum for driving the specific type of motors 46 and 48 utilized in the propulsion system. For example, these motors can be either alternating current induction motors wherein the invertor would supply an alternating voltage and current to the motors, or they may be dc motors wherein the invertor would modulate the dc energy and current coupled to the motors. In either case the electromagnetic energy generated by controlling the high voltages and high currents flowing between the primary battery 40 and the motors 46 and 48 can generate electromagnetic interference in the form of voltage and current pulses that are disruptive to the reliable operation of the low power vehicle system controller 32. For this reason it is desirable to separate the ground systems between the power control electronics and the signal control electronics as illustrated in FIG. 1.

The bi-directional digital communications network segments 21 and 22 coupled to the optical isolator 10 in the first preferred embodiment utilizes the SAE (Society of Automotive Engineers) J-1850 standard communications protocol, and more specifically, an implementation of the protocol described in U.S. Pat. No. 4,715,031, with both of these documents being incorporated herein by reference for the purpose of explaining the operation of the J-1850 protocol in conjunction with the preferred implementation of the associated communication system. However, the following abbreviated summary will be provided.

The communications protocol utilizes a bus contention network characterized by a unified system of nodes, each capable of accessing the network based on its own requirements. There are no master nodes, nor is the network dependent on any particular node for network operation. Since the communications network is optimized for use in an automotive vehicle, the network exhibits small network propagation delays, normally much less than a single bit period. Because the network "looks" small electrically, each bit of a message exists at all points or nodes on the network simultaneously. Each transmitter, therefore, is aware of network activity on a bit-by-bit basis in real time. This allows a technique of message arbitration which resolves conflicts "on the fly". Messages are not destroyed in the arbitration process; rather, the network sees one of the conflicting messages with the highest priority as being valid. The losing transmitter detects this arbitration and tries again as soon as the first message has passed.

Figure 4:
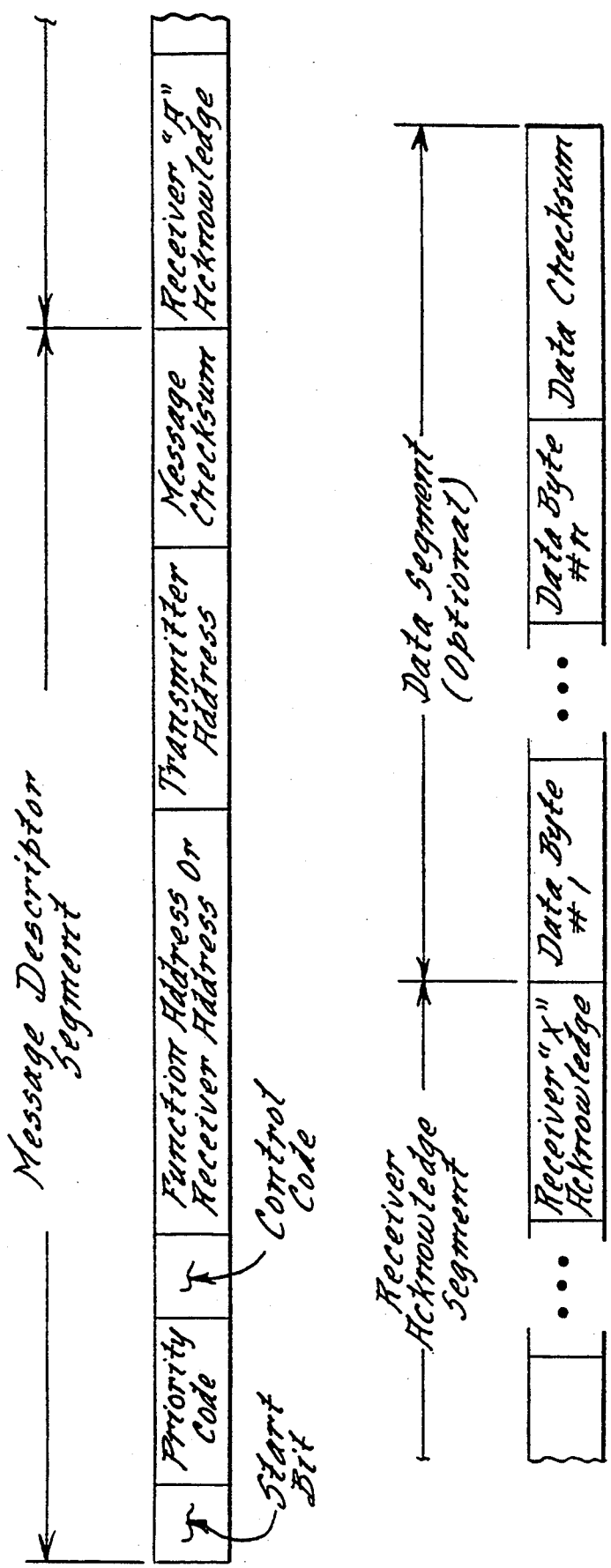
FIG. 4 illustrates the basic message protocol for a preferred implementation of a J-1850 network in accordance with the present invention.

As illustrated in FIG. 4, the protocol utilizes a priority field which guarantees network access in less than one message period for high priority messages. The protocol increases message transmission/reception reliability by providing for a fully acknowledged communication protocol. Each message period includes a positive acknowledgment portion through which each receiving control module/node will provide its unique address on data bus. In this manner, a system-wide hand shaking technique provides a positive indication to the transmitting module that the message was received and the identity of each receiver.

Message contention on the network bus is handled on a bit-wise contention and arbitration as basis as illustrated in FIG. 6. Therefore, for every collision of messages on the network, the message with the highest priority will dominate and continue to be transmitted. No bus time is lost due to collisions, because each message type is arbitrated on a bit-by-bit basis for each bit transmitted on the bus, and the dominant message prevails. In this manner a valid message will be transmitted while the lower priority message will be inhibited from further transmission. In a preferred embodiment the system utilizes a signal data bus communication link that includes a twisted wire medium for data transmission.

Each node (or module) contains (1) an address to identify that particular control module, and (2) unique function codes that correspond to the particular functions handled by the associated node processor. The protocol illustrated in FIG. 4 is capable of Utilizing two general types of messages. First, a node-to-node type message is designated with a specific transmitter and receiver address contained in the message. A second general type of message is a functional message which is intended for global broadcast distribution on the network. The first type of functional message is termed as a "functional command" message, where the entire message is transmitted and acknowledged as received by one or more of the other control modules programmed to receive the particular function command contained in the message. A second type of function message is termed as a "functional data transfer" message, which is an expansion of the functional command message to include additional informational data following the receiver acknowledgment portion of the protocol, and is also intended for global distribution on the network.

Figure 5A:
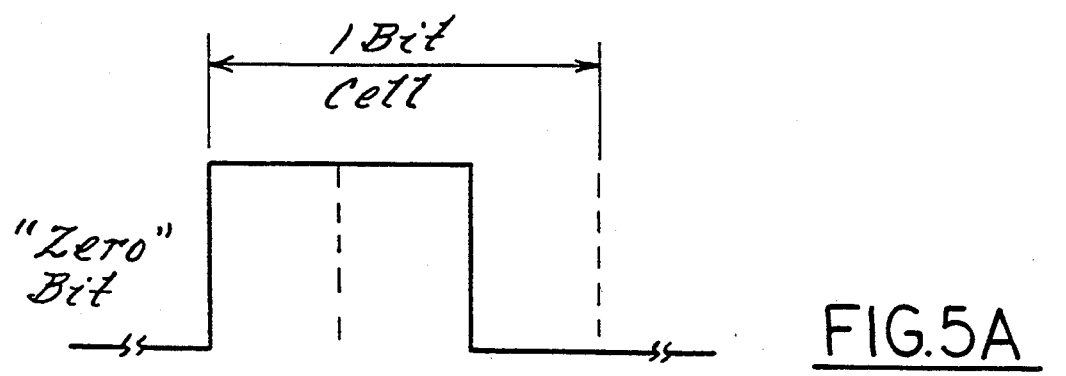
FIGS. 5 a, b and c illustrate the pulse width modulation binary zero, one and start bit waveform signals in accordance with the present invention.
Figure 5B:
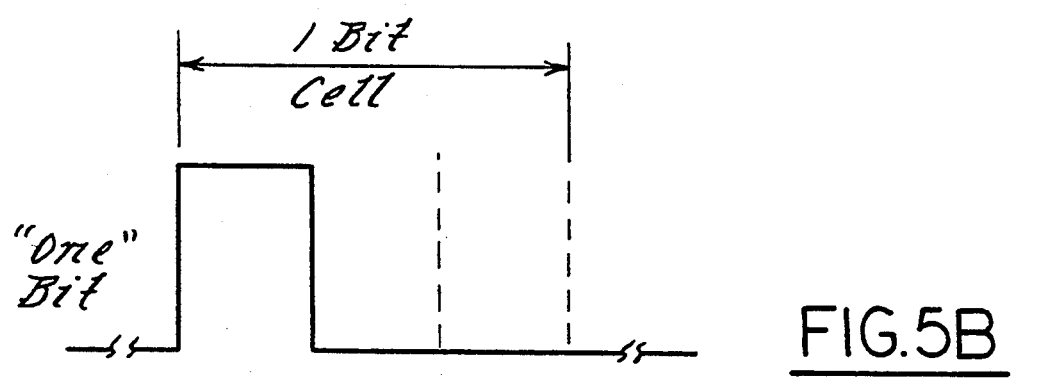
Figure 5C:
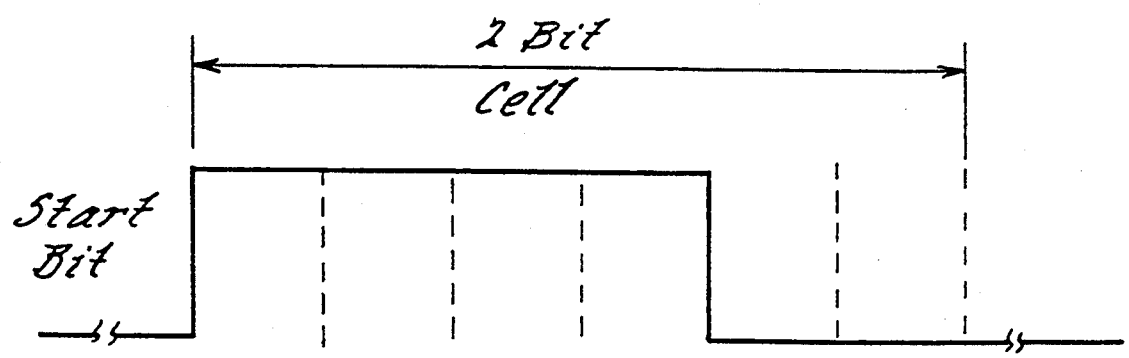

In the message descriptor segment of the protocol illustrated in FIGS. 4 and 5c, a unique start bit is first provided following by a priority code. The priority code is utilized for message arbitrations on a bit-wise basis. Utilizing pulse width modulation techniques of conveying binary bit signals on the data bus, the bit-wise message arbitration technique will be explained as follows. Since each transmitter synchronizes to the leading edge of each signal pulse passing down the data bus, each transmitter will start its transmission at approximately the same time in synchronization with any message being transmitted on the data bus. Since under the priorities established for this system, a logic zero bit transmission is dominant over the logic one bit transmission on the data bus, any interference in priority codes will be resolved in favor of the dominant logic bit signal, namely the message with-the zero in the priority position (see for example FIGS. 5 and 6 herein and also columns 9–10 in U.S. Pat. No. 4,715,031). Once a dominant priority signal has been received, that transmission node will terminate further transmissions. In the event that two transmitters provide the same priority message at the same time to the data bus, the bit-wise arbitration method employed herein will continue arbitration through the entire message field and the conflict will be resolved as soon as one of the transmitters provides a dominant signal different from the other.

It should be apparent from the foregoing discussion of the J-1850 protocol that the timing of the digital bits transmitted along the network is critical to the proper functioning of the bit-wise priority contention system. Therefore, the introduction of any significant delays in the data transmission network can significantly degrade the performance of the protocol. Stated another way, the introduction of an optical isolator that would cause a significant delay in the transmission or reception of data bits would significantly degrade the performance of the system. It is against these objectives that the optical isolator in accordance with the present invention has been developed.

Figure 2:
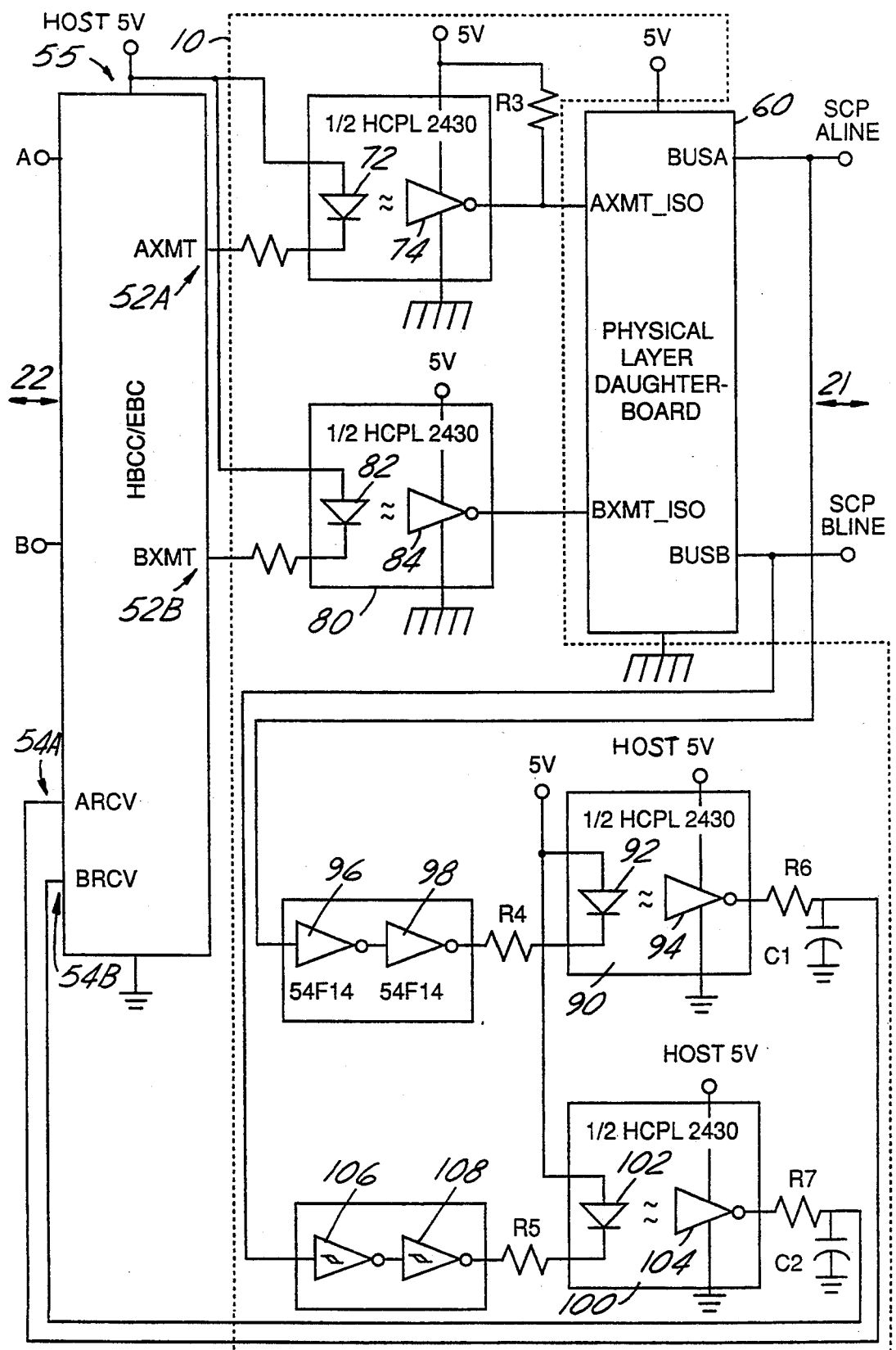
FIG. 2 illustrates a simplified schematic block diagram of the optical isolation system used in accordance with the present invention.

With reference to FIG. 2, a Hosted Bus Controller Circuit/Extended Bus Controller (the HBCC/EBC) integrated circuit 50 is provided as an implementation of the multiplexing technology disclosed in U.S. Pat. No. 4,715,031. If not for the use of the optical isolators in accordance with the present invention, the HBCC 50 would be coupled through the physical layer daughterboard 60 to the first line 21A and the second line 21B of the data communications network twisted pair conductors. However, in order to isolate the ground systems used between the signal control electronics and the power control electronics, it is necessary to insert optical isolators in each of the complementary data transmission lines, namely one each for the transmitter and receiver functions in each of the two transmission lines 21A and 21B, thereby providing a total of four optical isolators required in accordance with the present invention.

The HBCC 50 includes separate transmit and receive functions. With respect to the transmit function and the transmit output for the A line 52A, the electrical current associated with the data bits transmitted from the HBCC 50 are passed through the current limiting resistor R1 in order to excite the light emitting diode 72 within the first high speed opto coupler 70. The light emitted by the LED couples the signals optically with the photo receiver circuit 74 in the first opto coupler 70 which is located immediately adjacent to and within the opto coupler carrier device 70. The output of the photo detector circuits 74 is coupled to the AXMT ISO input of the physical layer daughterboard 60. Biasing resistor R3 is coupled on the output of the photo receiver circuit 74 and the network source of 5 volt power. Resistor R3 establishes the correct biasing current for the circuitry within the physical layer daughterboard 60 at terminal AXMT ISO.

With respect to the transmit function in the HBCC 50 and the transmit output for the B line 52B, the electrical current associated with the data bits transmitted from the HBCC 50 are passed through the current limiting resistor R3 in order to excite the light emitting diode 82 within the second high speed opto coupler 70. The light emitted by the LED couples the signals optically with the photo receiver circuit 84 in the second opto coupler 80 which is located immediately adjacent to and within the opto coupler carrier device 80. The output of the photo detector circuits 84 is coupled to the BXMT ISO input of the physical layer daughterboard 60.

The receive circuitry for the A line 21A will now be described. Line 21A is coupled to cascaded Schmidt Trigger Inverters 96 and 98 that produce a buffered, non-inverted, shape representation of the signals on line 21A. Series resistor R4 establishes sufficient biasing of the LEDs within the third high speed opto coupler 90 in order to minimize propagation delays. The isolated output of the third high speed opto coupler 90 passes through a resistor capacitor network comprising R6 and C1 which form a single pole low pass filter that is required by the input circuitry of the ARCV node 54A of the HBCC integrated circuit 50.

In a similar manner, the receive circuitry for line 21B will now be described. Line 21B is coupled to cascaded Schmidt Trigger Inverters 106 and 108 that produce a buffered, non-inverted, shape representation of the signals on line 21A. Series resistor R5 establishes sufficient biasing of the LEDs within the fourth high speed opto coupler 100 in order to minimize propagation delays. The isolated output of the fourth high speed opto coupler 100 passes through a resistor capacitor network comprising R7 and C2 which form a single pole low pass filter that is required by the input circuitry of the ARCV node 54B of the HBCC integrated circuit 50.

The power supply for the circuitry illustrated in FIG. 2 is necessarily divided into two electrically isolated sources. The host 5 volt source, which is coupled to the HBCC at terminal 55 and to the photo receiver side of high speed opto couplers 90 and 100 is provided by the isolated system. The network 12 volt supply is an unregulated 12 volt source that is referenced to the network ground. The network 5 volt source, which is coupled to the photo receiver circuits of the high speed opto coupled 70 and 80 as well as to the light emitting diodes of the high speed opto couplers 90 and 100, is a regulated 5 volt supply derived from the 12 volt source by the voltage drop across a linear voltage regulator (not illustrated).

The typical high speed opto coupler utilized in the preferred embodiment of the present invention is a Hewlett Packard 2430 optical transceiver pair, with two transceiver pairs per package. The speed of these optical couplers and the Schmidt Trigger Inverters driving them is critical to the proper functioning of the control system. A normal communications system of similar design possibly could operate properly with slower devices because there would be no critical specification on the delay of the signal caused by passing through the optical couplers. However, in control systems any delay in the system beyond a minimum level of approximately 500 ns would not only disrupt the proper operation of the bit-wise contention and priority system, but more importantly could destroy the stable operation of the control and feedback systems. This would result in host system not being able to transmit on the network. Insert short explanation of typical use/-transmission/reception of critical control signal examples.

While the forms of the invention herein disclosed constitute presently preferred embodiments, may others are possible. It is not intended herein to mention all of the possible equivalent forms or ramifications of the invention. It is understood that the terms used herein are merely descriptive rather than limiting, and that various changes may be made without departing from the spirit or scope of the invention as claimed.

We claim:

1. An optical isolator for use in an electrically powered vehicle for interfacing between a signal processing system having a first ground and power conversion system, operated responsive to control signals from the signal processing system, having a second ground that may vary in potential from the first ground, said isolator comprising:

a bi-directional, digital communications network having a first node coupled to the signal processing system for generating and receiving digital messages with respect to the first ground, and having a second node coupled to the power conversion system for receiving and generating digital messages with respect to the second ground, with said network having a unique start signal and dominant hierarchy that allows bit-wise contention among messages for assuring communication of high priority messages between said first and second nodes within a predetermined minimum time, and optical isolator means interposed between said first and second nodes of said network for transmitting the digital messages there between while electrically isolating the first ground from the second ground, wherein the control signals can be communicated through said network between the first node and the second node without delays in order to control the power conversion and propulsion of the vehicle.

2. The isolating communication system as described in claim 1 wherein said network includes at least two electrical conductors each isolated from and driven against one of said first and said second grounds.

3. The isolating communication system as described in claim 2 wherein said digital messages are simultaneously communicated along said two electrical conductors through complementary message protocols that cancel noise signals induced across said two electrical conductors.

4. The isolating communications system as described in claim 3 wherein said digital messages originated at said first node must be received and processed at said second node and an answering message transmitted by said second node and received and processed at said first node within a predetermined minimum time of 500 ns.

5. An optical isolator for use in an electrical communications network of the type having A and B complementary signal lines for interfacing between a signal processing system having a first ground and power conversion system, operated responsive to control signals from the signal processing system, having a second ground that may vary in potential from the first ground, said isolator comprising:

a bi-directional, digital communications network having a first node coupled to the signal processing system for generating and receiving complementary digital messages on A and B lines with respect to the first ground, and having a second node coupled to the power conversion system for receiving and generating complementary digital messages on A and B lines with respect to the second ground, with the network protocol having a unique start signal and dominant hierarchy that allows bit-wise contention among messages for assuring communication of high priority messages between said first and second nodes within a predetermined minimum time, and optical isolator means interposed between said first and second nodes of said network for transmitting the digital messages therebetween while electrically isolating the first ground from the second ground, wherein the control signals can be communicated through the network between said first node and the second node without delays in order to provide a stable control system for the power conversion and propulsion of the vehicle.

6. The isolating communication system as described in claim 5 wherein said digital messages are simultaneously communicated along said A and B electrical conductors through complementary message protocols that cancel noise signals induced across said A and B electrical conductors.

7. A method for isolating a first electrical ground in a signal processing system and a second electrical ground in a power conversion system operated responsive to control signals from the signal processing system, comprising the steps of:

generating and receiving digital control messages with respect to the first ground at a first node along a bi-directional, digital communications network, generating and receiving digital feedback messages with respect to a second ground at a second node coupled to and for controlling the power conversion systems with respect to the second ground, with the network protocol of said control and feedback messages having a unique start signal and dominant hierarchy that allows bit-wise contention among messages for assuring communication of high priority messages between said first and second nodes within a predetermined minimum time, and transmitting the digital messages within one half of said predetermined minimum period of time through optical isolator means inserted between said first and second nodes while electrically isolating the first ground from the second ground, wherein the control signals are communicated through said network between the first node and the second node with said minimum delays in order to maintain the stability of the system.

8. The method as described in claim 7 wherein said control and feedback signals are electrically conducted along said network along at least two electrical conductors each isolated from and driven against one of said first and said second grounds.

9. The method as described in claim 8 wherein said digital messages are simultaneously communicated along said two electrical conductors through complementary message protocols that cancel ambient signals induced across said two electrical conductors.

* * * * *